United States Patent [19]

Schwander et al.

[11] 4,041,052
[45] Aug. 9, 1977

[54] ANTHRAQUINONE DYESTUFFS OF THE DISPERSE SERIES

[75] Inventors: Hansrudolf Schwander, Riehen; Urs Karlen, Magden, both of Switzerland

[73] Assignee: Ciba-Geigy Corporation, Ardsley, N.Y.

[21] Appl. No.: 656,467

[22] Filed: Feb. 9, 1976

[30] Foreign Application Priority Data

Feb. 20, 1975 Switzerland .................. 2153/75

[51] Int. Cl.² .................. C09B 1/54; C09B 1/56; C09B 1/02
[52] U.S. Cl. .................. 260/380; 260/383
[58] Field of Search .................. 260/380, 383

[56] References Cited

U.S. PATENT DOCUMENTS

| | | | |
|---|---|---|---|
| 2,640,059 | 5/1953 | Salvin et al. | 260/380 X |
| 2,640,062 | 5/1953 | Seymour et al. | 260/380 |
| 2,972,622 | 2/1961 | Grossmann | 260/380 |
| 2,992,240 | 7/1961 | Lodge | 260/380 |
| 3,361,772 | 1/1968 | May et al. | 260/383 |
| 3,389,152 | 6/1968 | May et al. | 260/383 |
| 3,704,252 | 11/1972 | Bien et al. | 260/380 |
| 3,743,476 | 7/1973 | Gehrke et al. | 260/380 X |
| 3,822,992 | 7/1974 | Hederich et al. | 260/380 X |

*Primary Examiner*—Paul F. Shaver
*Attorney, Agent, or Firm*—Karl F. Jorda; Edward McC. Roberts; Prabodh I. Almaula

[57] ABSTRACT

An anthraquinone dyestuff which is sparingly soluble in water of the formula

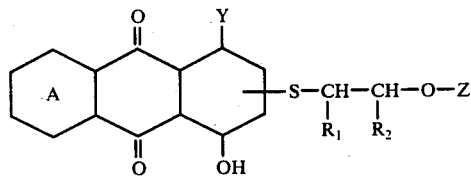

wherein Y is amino, alkylated amino or hydroxyl, the ring A can be substituted by halogen, methyl, ethyl, methoxy, ethoxy, nitro or acylamino, Z is acyl or hydrogen, and one of $R_1$ and $R_2$ is hydrogen and the other is a substituted or unsubstituted lower alkyl, cycloalkyl, or aryl or a carboxy ester group. The dyestuffs dye polyester fibers in orange or red-violet shades with good fastness.

12 Claims, No Drawings

ANTHRAQUINONE DYESTUFFS OF THE DISPERSE SERIES

The present invention provides new anthraquinone dyes which are sparingly soluble in water and can be used as disperse dyes, a process for their manufacture, a method of using the new anthraquinone dyes for dyeing hydrophobic organic fibrous material, especially textile fibres derived from linear polyesters of aromatic polycarobxylic aicds and polyhydric alcohols or from cellulose esters, and, in the form of an industrial product, the fibrous material dyed with the new dyes.

According to the invention there are provided useful new anthraquinone dyes which are sparingly soluble in water of formula (I)

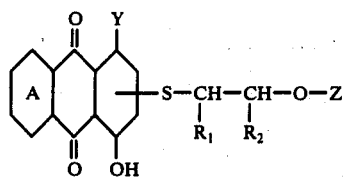
(I)

wherein Y represents an optionally alkylated amino group or a hydroxyl group, the ring A can be substituted by halogen atoms, methyl, ethyl, methoxy, ethoxy, nitro or acylamino groups, Z represents an acyl radical or preferably hydrogen, and one of the radicals $R_1$ and $R_2$ represents hydrogen and the other represents a substituted or unsubstituted lower alkyl, cycloalkyl, or aryl radical or a carboxy ester group.

The dyes of the present invention are obtained by either a. adding epoxy compounds of formula (II)

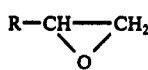
(II)

in which R represents a substituted or unsubstituted lower alkyl, cycloalkyl or aryl radical which corresponds to the radicals $R_1$ or $R_2$, or represents a carboxy ester group, to anthraquinones of formula (III)

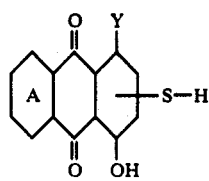
(III)

and, if appropriate, subsequently acylating the adducts obtained, or b. by reacting compounds of formula (IV)

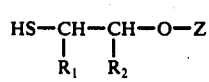
(IV)

with anthraquinones of formula (V)

(V)

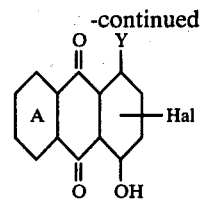

which are halogenated in the β-position, wherein Hal represents a halogen atom, preferably a chlorine or bromine atom.

Throughout this specification, water-solubilizing groups which exhibit acid dissociation in water and which are excluded from the dyes of the present invention, are to be understood as meaning the known substituents that impart anionic character to the dyes, for example sulphonic acid or phosphoric acid groups, preferably also —COOH.

An alkyl radical represented by one of $R_1$ and $R_2$ can be substituted, primarily in the β-position. Examples of possible substituents are: lower alkyl groups, for example methyl, ethyl or butyl groups, lower alkoxy groups, for example the methoxy or ethoxy group, cycloalkoxy groups, for example the cyclohexyloxy group, phenalkoxy groups, for example the benzyloxy group, aryloxy groups, especially the phenoxy group, acyloxy groups, in particular lower alkanoyloxy groups, for example the acetyloxy group, the cyano group, or halogens, for example chlorine or bromine.

Possible cycloalkyl groups represented by $R_1$ or $R_2$ are, for example, cycloalkyl groups with preferably 5-or 6-membered rings, and, in particular, the cyclohexyl group.

A carboxy ester group represented by one of $R_1$ or $R_2$ is preferably a lower alkoxycarbonyl group, for example the carbomethoxy, carboethoxy, carboisopropoxy or carbobutoxy group.

The aryl radical $R_1$ or $R_2$ belongs preferably to the benzene series and can contain customary non-ionogenic substituents. Examples of such substituents, in particular at the phenyl radical, are halogens, such as fluorine, chlorine or bromine, lower alkyl or lower alkoxy groups, lower alkoxycarbonyl groups, cyano, nitro lower alkylcarbonyl or trifluoromethyl groups.

An acyl radical represented by Z is in particular a lower alkanoyl group which advantageously contains 2 to 4 carbon atoms.

Y represents alkylamino of 1 to 5 carbon atoms, hydroxyethylamino, preferably, however, OH or $NH_2$.

The expression lower used to qualify "alkyl,""alkoxy" or "alkanoyl," denotes that the group or organic group constituent contains at most 5 carbon atoms.

Particularly useful dyes are those of formula (I), wherein Y is amino, amino carrying $C_1$-$C_4$-alkyl, or hydroxyl, the ring A can be substituted by $C_1$-$C_2$-alkyl, $C_1$-$C_2$-alkoxy, nitro or $C_1$-$C_4$-alkylcarbonylamino, Z is $C_1$-$C_4$-alkylcarbonyl, $C_1$-$C_4$-alkylaminocarbonyl, $C_1$-$C_4$-alkyloxycarbonyl, —CHO, or hydrogen, and of $R_1$ and $R_2$ one R is hydrogen and the other is $C_1$-$C_8$-alkyl, $C_1$-$C_8$-alkyl substituted by $C_1$-$C_4$-alkoxy, cyclohexyl, cyclopentyl, cyclopentyloxy, cyclohexyloxy, benzyloxy, phenethoxy, phenoxy, phenyl, nitrophenyl, $C_1$-$C_2$-alkoxyphenyl, chlorophenyl, $C_1$-$C_2$alkylphenyl, bromophenyl, fluorophenyl, $C_1$-$C_4$-alkylcarbonyloxy, cyano, chlorine, bromine, and $C_1$-$C_2$-alkoxy-$C_1$-$C_2$-alkoxy; cyclohexyl and cyclopentyl; carbo($C_1$-$C_4$-alkoxy); phenyl, and phenyl substituted by fluorine, bromine, chlorine, nitro, cyano, C$_1$–C$_3$-alkyl, C$_1$–C$_3$-alkoxy, C$_1$–C$_4$-alkoxycarbonyl, C$_1$–C$_4$-alkylcarbonyl, C$_1$–C$_4$-alkylcarbonylamino or trifluoromethyl.

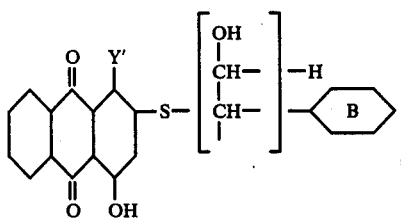

wherein Y' represents OH or NH$_2$ and the ring B, as mentioned hereinbefore, can be substituted.

The reaction of the epoxides used as starting products in accordance with process (a) takes place in the presence of suitable acid or basic catalysts. As acid catalysts there may be mentioned primarily Lewis acids, for example halides of the metals and metalloids of Groups IB and II to VIII of the Periodic Table, for instance aluminum chloride, zinc chloride, iron(III) chloride, tin tetrachloride, arsenic tetrachloride, tin dichloride, antimony pentachloride, magnesium chloride, magnesium bromide, calcium bromide, calcium iodide, strontium bromide, chromium(III) bromide, manganese(II) chloride, cobalt(II) and cobalt(III) chloride, copper(II) bromide, cerium(IV) chloride, thorium chloride, arsenic triiodide, boron halides, for example boron trifluoride and boron trichloride or complexes thereof, oxonium and diazonium salts, for example hexafluoroarsenates, hexafluoroantimonates, hexafluorophosphates, fluoroborates or perchlorates.

A preferred catalyst is boron trifluoride. Further Lewis acids are mineral acids, for example hydrochloric acid, hydrobromic acid, sulphuric acid, phosphoric acid and perchloric acid.

The reaction of the epoxides can also take place in the presence of alkalies (NaOH, KOH), or tertiary amines. Examples of suitable amines are:
dimethyldodecylamine,
dimethyltetradecylamine,
diethylhexadecylamine,
methyl ethyl octadecylamine,
trimethylamine,
diethylmethylamine,
tri-n-propylamine,
tri-n-butylamine,
tri-n-amylamine,
diethylisopropylamine,
dimethyl-n-butylamine,
dimethylcyclohexylamine,
N-methylpiperidine,
N-ethylpiperidine,
N-propylpiperidine,
N-isopropylpiperidine,
N-isoamylpiperidine,
N-methyl-3-isopropylpiperidine,
3-diethylpiperidine,
N,N'-dimethylpiperazine,
N,N'-diethylpiperazine,
N,N'-dipropylpiperizine,
N,N'-diisoamylpiperazine,
N,N,N',N'-tetramethyl-trimethylenediamine,
N,N,N',N'-tetraethyl-trimethylenediamine,
N,N,N',N'-tetramethyltetraethylenediamine and
N,N,N',N'-tetramethylhexamethylenediamine.

Examples of the preferred amines comprises triethylamine, tri-n-butylamine.

Examples of suitable epoxide starting products are:
1,2-epoxybutane,
2,3-epoxybutane,
1,2-epoxypentane,
2,3-epoxypentane,
2,3-epoxy-3-ethylpentane,
1,2-epoxyhexane,
3,4-epoxyhexane,
1,2-epoxyheptane,
2,3-epoxyoctane,
2,3-dimethyl-2,3-epoxypentane,
1,2-epoxy-4-methylpentane,
2,3-epoxy-5-methylhexane,
1,2-epoxy-4,4-dimethylpentane,
4,5-epoxyeicosane,
2,3-epoxy-4-chlorobutane,
1,2-epoxy-4-bromobutane,
1,2-epoxy-3,4-dibromobutane,
3,4-epoxy-2-chlorohexane,
1,5-dichloro-2,3-epoxypentane,
2-iodo-3,4-epoxybutane,
(1,2-epoxy-1-methylethyl)-benzene,
(3-chloro-1,2-epoxypropyl)-benzene,
6-oxabicyclo[3,1,0]hexane,
7-oxabicyclo[4,1,0]heptane,
3-propyl-7-oxabicyclo[4,1,0]heptane,
tert.butyl-4,5-epoxyhexyl-ether,
2-phenylethyl-3,4-epoxybutyl-ether and above all styrene oxide.

The reaction takes place advantageously in alcohol or in inert solvents at elevated temperature (e.g., 0° to 60° C). Solvents such as dimethyl formamide, can also be used.

In the course of this addition reaction two isomeric compounds of the formulae VIa and VIb can result.

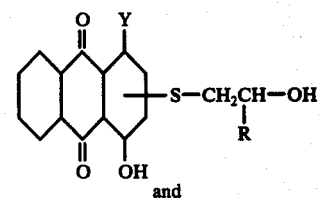

(VIa)

and

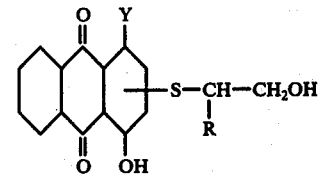

(VIb)

These compounds are subsequently represented by the general formula (VI)

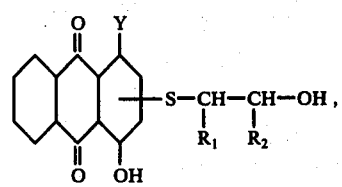

(VI)

wherein Y, R$_1$ and R$_2$ are as defined hereinbefore. These isomeric mixtures contain as a rule a substantially greater proportion of the compound of formula (VIa), which can be obtained, if desired, in analytically pure form by recrystallisation. However, such a purification is not necessary for the industrial use of the dyes resulting therefrom.

Where Z in formula (I) represents an acyl radical, the addition products of formula (VI) are acylated with a compound that introduce the acyl radical Z, for example with a halide (chloride or bromide) of the acid in the presence of alkali or tertiary amines, an aldehyde (acetic anhydride, propionic anhydride), or with an isocyanate (at elevated temperature in inert solvents).

Possible acyl radicals are, for example, fatty acid radicals of 1 to 5 carbon atoms, such as formyl, acetyl, propionyl, butyryl radicals; alkylcarbamyl radicals containing up to 5 carbon atoms, such as methylaminocarbonyl, ethylaminocarbonyl, propylaminocarbonyl or butylaminocarbonyl radicals; alkyloxycarbonyl radicals of 1 to 5 carbon atoms, such as methoxycarbonyl, ethoxycarbonyl, propoxycarbonyl or butoxycarbonyl radicals; phenylcarbamyl or phenoxycarbonyl radicals, benzoyl, terephthoyl, phthaloyl, lower alkoxycarbonylbenzoyl, hexahydrobenzoyl, methoxyacetyl, lower alkylsuccinyl, malonyl, phenoxyacetyl, chloroacetyl or phenylacetyl radical.

suitable anthraquinone derivatives for the addition of the epoxide compounds are, for example, 1,4-dihydroxy-2-mercapto-anthraquinone, 1-amino-2-mercapto-4-hydroxy-anthraquinone, wherein the amino groups can be mono- or disubstituted, for example by lower alkyl groups (methyl, ethyl, β-hydroxyethyl, propyl or butyl groups), cycloalkyl groups (cyclohexyl radicals), or by mono- or polynuclear aryl radicals (e.g. phenyl, chlorophenyl, bromophenyl, lower alkoxyphenyl, lower alkylphenyl or phenoxyphenyl radicals).

The reaction of the compounds of formula (VI) with the anthraquinones of formula (V) which are halogenated in the β-position takes place in the presence of hydrogen halide binding agents, for example alkalies or organic bases, such as pyridine or tri-lower alkylamines (triethylamine, tripropylamine).

Suitable starting compounds of formula (IV) are those of the formulae

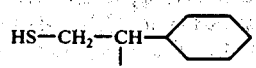

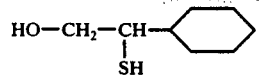

The dyes of the present invention which contain no water-solubilizing groups belong to the group of disperse dyes as described, for example, in the Colour Index. They are highly suitable for dyeing and printing leather, wool, silk and, above all, synthetic fibres, for example acrylic or acrylonitrile fibres, polyacrylonitrile fibres and copolymers of acrylonitrile and other vinyl compounds, such as acrylic esters, acrylic amides, vinyl pyridine, vinyl chloride, or vinylidene chloride, copolymers of dicyanoethylene and vinyl acetate, and of acrylonitrile block co-polymers; fibres obtained from polyurethanes, polyolefins, such as basically modified polypropylene, polypropylene modified with nickel or unmodified polypropylene, polyamides, such as nylon 6, nylon 6 6 or nylon 12, and expecially fibres of cellulose triacetate and cellulose 2½-acetate, and of aromatic polyesters, such as those obtained from terephthalic acid and ethylene glycol or 1,4-dimethylolcyclohexane and co-polymers of terephthalic acid and isoterephthalic acid with ethylene glycol.

The dyeing of the above mentioned fibre materials with dyes according to the invention which are sparingly soluble in water, is carried out preferably from an aqueous dispersion. It is appropriate, therefore, to finely divide the compounds suitable for use as disperse dyes by grinding them with textile assistants, for example dispersants, and possibly with other grinding assistants. By subsequent drying, dyestuff preparations are obtained consisting of textile assistant and the dye. These preparations normally contain 5 to 80%, preferably 10 to 60%, of dye.

Examples of dispersants of the non-ionic group that can be used with advantage are: addition products of 8 moles of ethylene oxide with 1 mole of p-tert.-octylphenol, of 15 or 6 moles of ethylene oxide with castor oil, of 20 moles of ethylene oxide with the alcohol $C_{16}H_{33}OH$, ethylene oxide addition products with di-[α-phenylethyl]-phenols, polyethylene oxide-tert.-dodecyl-thioether, polyamine-polyglycol ether or addition products of 15 or 30 moles of ethylene oxide with 1 mole of the amine $C_{12}H_{25}NH_2$ or $C_{18}H_{37}NH_2$.

Examples of anionic dispersants are sulphuric acid esters of alcohols of the fatty series containing 8 to 20 carbon atoms, of the ethylenoxy adducts of the corresponding fatty acid amides, or of alkylated phenols containing 8 to 12 carbon atoms in the alkyl moiety, sulphonic acid esters with alkyl radicals containing 8 to 20 carbon atoms; sulphation products of unsaturated fats and oils; phosphoric acid esters containing 8 to 20 carbon atoms; fatty acid soaps, also alkylaryl sulphonates, condensation products of formaldehyde with naphthalenesulphonic acid and lignin sulphonates.

Suitable cationic dispersants are quaternary ammonium compounds that contain alkyl or aralkyl radicals of 8 to 20 carbon atoms.

In addition to containing the dispersants, the dyestuff preparations can contain organic solvents, especially solvents that boil above 100° C, which are preferably miscible with water, such as mono- and dialkylglycol ether, dioxan, dimethyl formaldehyde or dimethyl acetamide, tetramethylenesulphone or dimethyl sulphoxide. Dye, dispersant and solvent can with advantage be ground together.

The polyester fibres are dyed from aqueous dispersion with the dyestuffs of the present invention, which are sparingly soluble in water, by the conventional methods of dyeing polyester material. Polyesters of aromatic polycarboxylic acids with polyfunctional alcohols are dyed preferably at temperatures of over 100° C under pressure. However, the dyeing can also be carried out at the boiling point of the dyebath in the presence of dyestuff carriers, for example phenylphenols, polychlorobenzene compounds or similar assistants, or by the thermosol process, that is to say padding with subsequent after-treatment with the application of heat, for example thermofixation, at 180–210° C. Cellulose 2½-acetate fibres are dyed preferably at temperatures of 80–85° C, whereas cellulose triacetate fibres are dyed advantageously at the boiling point of the dyebath. The use of dyestuff carriers is superfluous in dyeing cellulose 2½-acetate or polyamide fibres. The dyes of the present invention can also be used for printing the cited materials by conventional methods.

The dyeings obtained according to the process of this invention can be subjected to an after-treatment, for example by heating with an aqueous solution of an ion-free detergent.

According to the process of the present invention, the cited compounds can also be applied by printing instead of by impregnating. This is accomplished by using, for example, a printing ink which contains the finely dispersed dyestuff in addition to the customary assistants used in the printing industry, for example wetting agents and thickeners.

It is also possible to dye, for example, synthetic fibres, such as polyesters and polyamides, in organic solvent liquors, for instance a mixture of perchloroethylene and dimethyl formamide or in pure perchloroethylene.

According to the process of the present invention, strong, brilliant dyeings and prints possessing excellent fastness properties are obtained, expecially fastness to light, thermofixation, sublimation, pleating, exhaust gas, cross-dyeing, dry-cleaning, ironing, rubbing, chlorine, and wet fastness, for example fastness to water, washing and perspiration.

It is also possible to use the new water-insoluble dyes for the spin dyeing of polyamides, polyesters and polyolefins. The polymer to be dyed in advantageously in the form of powder, grains or chips, as ready prepared spinning solution or mixed in the fused state with the dye which is introduced in the dry state or in the form of a dispersion or solution in an optionally volatile solvent. After the dye has been uniformly distributed in the solution or the melt of the polymer, the mixture is processed in known manner by pouring, moulding or extruding to fibres, yarns, monofilaments, films and the like.

In the following Examples, the parts and percentages are by weight unless otherwise indicated. The relationship between parts by weight and parts by volume is the same as that between the gram and the cubic centimeter.

EXAMPLE 1

A mixture consisting of 5.45 parts of 1-amino-2-chloro-4-hydroxy-anthraquinone, 6.20 parts of an isomeric mixture of the two components of formula

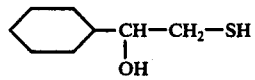

and

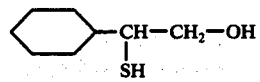

(obtained by addition of $H_2S$ to styrene oxide), 1.60 parts of sodium hydroxide and 30 ml of water is stirred for 2 hours in an atmosphere of nitrogen ata temperature of 87° to 90° C. The mixture is then allowed to cool and the precipitated dye is isolated by filtration at 45° C and subsequently washed with water of 50° C and then with methanol. After it has been dried in vacuo at 70° C, the dye is obtained as a dark violet powder with a melting point of 154° C. The dye is in the form of an isomeric mixture consisting of the two components of formulae

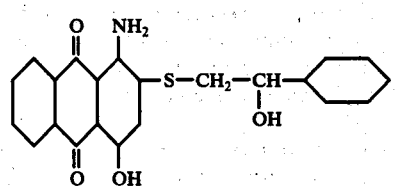

and

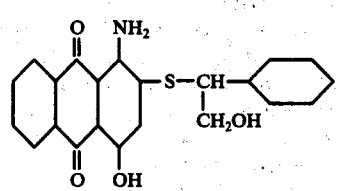

which can be separated into pure components by known chromatographic methods. However, such a separation is of no advantage for use in actual practice. The dyestuff mixture colors polyester fibres in bluish red shades.

By repeating the same procedure, but using instead of the mercapto compounds cited above those listed in column I to Table 1 (obtained in analogous manner by reacting the corresponding epoxides with $H_2S$; only one of the possible isomers is listed in the table), the dyes listed in column II are obtained, which colour polyester fibres in bluish red shades with good fastness properties.

Table 1

| I<br>Mercapto compounds | II<br>Anthraquinone dyes |
|---|---|
| 1 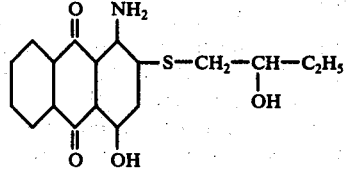 | 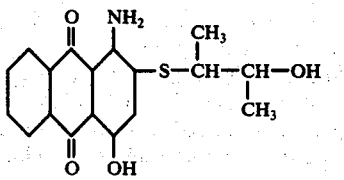 |
| 2 | |

Table 1-continued

| | I<br>Mercapto compounds | II<br>Anthraquinone dyes |
|---|---|---|
| 3 | HS—CH$_2$—CH(OH)—C$_3$H$_7$ | 1-amino-4-hydroxy-2-(2-hydroxypropylthio... S—CH$_2$—CH(OH)—C$_3$H$_7$ |
| 4 | H$_3$C—CH(SH)—CH(OH)—C$_2$H$_5$ | S—CH(CH$_3$)—CH(OH)—C$_2$H$_5$ |
| 5 | H$_3$C—CH(SH)—C(OH)(C$_2$H$_5$)(C$_2$H$_5$) | S—CH(CH$_3$)—C(OH)(C$_2$H$_5$)(C$_2$H$_5$) |
| 6 | HS—CH$_2$—CH(OH)—C$_4$H$_9$ | S—CH$_2$—CH(OH)—C$_4$H$_9$ |
| 7 | H$_5$C$_2$—CH(SH)—CH(OH)—C$_2$H$_5$ | S—CH(C$_2$H$_5$)—CH(OH)—C$_2$H$_5$ |
| 8 | HS—CH$_2$—CH(OH)—C$_5$H$_{11}$ | S—CH$_2$—CH(OH)—C$_5$H$_{11}$ |
| 9 | H$_3$C—CH(SH)—CH(OH)—C$_5$H$_{11}$ | S—CH(CH$_3$)—CH(OH)—C$_5$H$_{11}$ |
| 10 | H$_3$C—C(CH$_3$)(SH)—C(CH$_3$)(OH)—C$_2$H$_5$ | S—C(CH$_3$)(CH$_3$)—C(CH$_3$)(OH)—C$_2$H$_5$ |
| 11 | HS—CH$_2$—CH(OH)—CH$_2$—CH(CH$_3$)$_2$ | S—CH$_2$—CH(OH)—CH$_2$—CH(CH$_3$)$_2$ |

(All anthraquinone dyes shown are 1-amino-4-hydroxyanthraquinone derivatives with the 2-position substituted by the corresponding thioether.)

Table 1-continued

| | I<br>Mercapto compounds | II<br>Anthraquinone dyes |
|---|---|---|
| 12 | HS—CH₂—C(CH₃)(OH)—C₆H₁₁ | 1-amino-4-hydroxy-2-[S—CH₂—C(CH₃)(OH)—C₆H₁₁]-anthraquinone |
| 13 | HS—CH₂—CH(OH)—CH₂—O—C₆H₁₁ | 1-amino-4-hydroxy-2-[S—CH₂—CH(OH)—CH₂—O—C₆H₁₁]-anthraquinone |
| 14 | HS—CH₂—CH(OH)—C₆H₁₀(CH₃) (2-methylcyclohexyl) | 1-amino-4-hydroxy-2-[S—CH₂—CH(OH)—C₆H₁₀(CH₃)]-anthraquinone |
| 15 | HS—CH₂—CH(OH)—C₆H₁₀(CH₃) (3-methylcyclohexyl) | 1-amino-4-hydroxy-2-[S—CH₂—CH(OH)—C₆H₁₀(CH₃)]-anthraquinone |
| 16 | HS—CH₂—CH(OH)—C₆H₁₀—CH₃ (4-methylcyclohexyl) | 1-amino-4-hydroxy-2-[S—CH₂—CH(OH)—C₆H₁₀—CH₃]-anthraquinone |
| 17 | HS—CH₂—CH(OH)—C₆H₁₀Cl (2-chlorocyclohexyl) | 1-amino-4-hydroxy-2-[S—CH₂—CH(OH)—C₆H₁₀Cl]-anthraquinone |
| 18 | HS—CH₂—CH(OH)—C₆H₁₀Cl (3-chlorocyclohexyl) | 1-amino-4-hydroxy-2-[S—CH₂—CH(OH)—C₆H₁₀Cl]-anthraquinone |
| 19 | HS—CH₂—CH(OH)—C₆H₁₀—Cl (4-chlorocyclohexyl) | 1-amino-4-hydroxy-2-[S—CH₂—CH(OH)—C₆H₁₀—Cl]-anthraquinone |
| 20 | HS—CH₂—CH(OH)—COOCH₃ | 1-amino-4-hydroxy-2-[S—CH₂—CH(OH)—COOCH₃]-anthraquinone |

Table 1-continued

| | I<br>Mercapto compounds | II<br>Anthraquinone dyes |
|---|---|---|
| 21 | HS—CH$_2$—CH(OH)—COOC$_2$H$_5$ | anthraquinone with NH$_2$, S—CH$_2$—CH(OH)—COOC$_2$H$_5$, and OH substituents |

EXAMPLE 2

A mixture consisting of 5.40 parts of the compound of formula

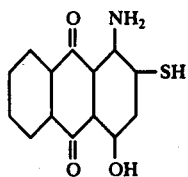

2.90 parts of styrene oxide, 1 part of triethylamine and 30 parts of isopropanol is stirred for 1 hour at reflux temperature and then diluted with a mixture of 20 parts of methanol and 50 parts of water. The batch is stirred for a further 15 minutes at the boil and then allowed to cool overnight. The precipitate of the dye is filtered off and washed with a mixture of methanol/water in the ratio 1:1 until the washing filtrate runs bright blue in color. The dye is then dried at 70° C. The resultant dye consists of the isomers of formulae

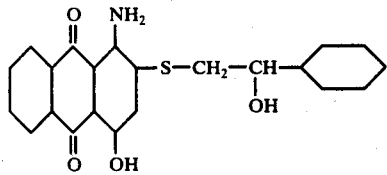

and

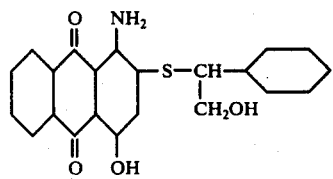

When applied as disperse dye to polyester fibres by the customary dyeing processes it yields reddish violet dyeings with good fastness properties, in particular good light fastness.

EXAMPLE 3

8 parts of triethylamine are dissolved in 1000 parts of ethyl alcohol and this solution is saturated for 1 hour with hydrogen sulphide gas. Then 60 parts of styrene oxide are added dropwise in the course of 45 minutes. Hydrogen sulphide is passed in for a further hour at 45° C. Excess hydrogen sulphide is expelled with nitrogen and then 21 parts of potassium carbonate and 78.3 parts of 2-bromoquinizarine are added to the solution. After 2 hours reaction time at 70° C the batch is allowed to cool to room temperature. The dye is filtered and washed with 2000 parts of alcohol and 1000 parts of water to yield 85 parts of a dyestuff mixture of the following constitution:

main component:

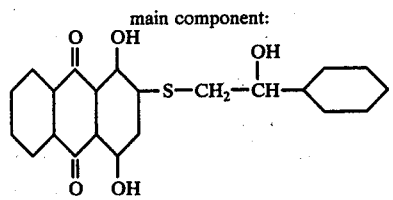

and a small proportion of

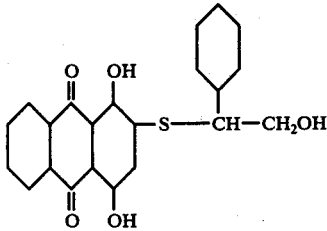

The dye can be separated by chromatography into the components. It dyes polyester fibres in orange shades with good fastness properties.

By carrying out the same procedure, but using instead of styrene oxide equivalent amounts of the epoxides listed in column I of Table 2, the disperse dyes of column II are obtained (in each case only one of the two possible isomers is indicated), which dye polyester fibres in brilliant orange shades by the conventional methods of applying disperse dyes. The dyeings have good fastness properties, in particular a very good light-fastness.

Table 2
| | I Epoxides | II Anthraquinone dyes |
|---|---|---|
| 1 | 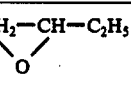 | 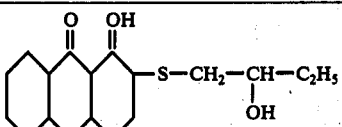 |
| 2 | 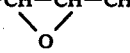 | 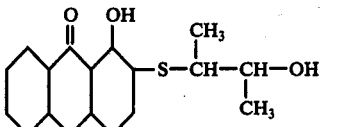 |
| 3 | 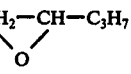 | 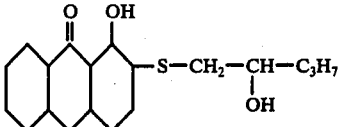 |
| 4 | 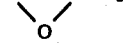 | 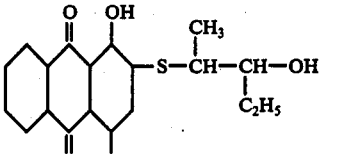 |
| 5 | 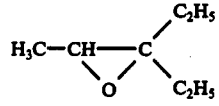 | 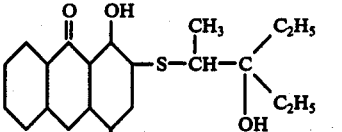 |
| 6 |  | 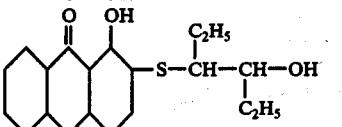 |
| 7 | 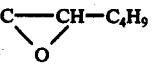 | 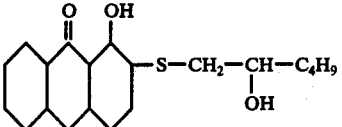 |
| 8 |  | 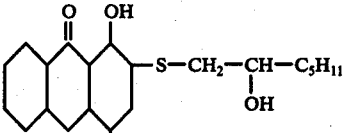 |
| 9 | 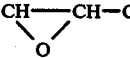 | 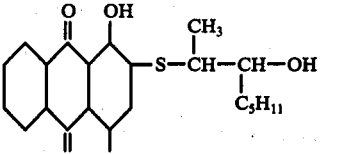 |
| 10 | 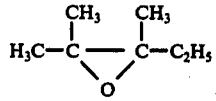 | 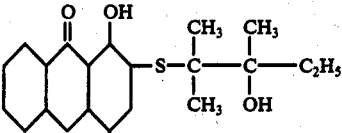 |

Table 2-continued

| | I Epoxides | II Anthraquinone dyes |
|---|---|---|
| 11 | CH₂–CH–CH(CH₃)–CH₃ (epoxide), with isobutyl group | 1,4,5,8-tetrahydroxyanthraquinone with –S–CH₂–CH(OH)–CH₂–CH(CH₃)–CH₃ |
| 12 | CH₂–C(CH₃)(phenyl) epoxide | anthraquinone –S–CH₂–C(CH₃)(OH)(phenyl) |
| 13 | CH₂–CH–CH₂–O–phenyl epoxide | anthraquinone –S–CH₂–CH(OH)–CH₂–O–phenyl |
| 14 | CH₂–CH–(2-methylphenyl) epoxide | anthraquinone –S–CH₂–CH(OH)–(2-methylphenyl) |
| 15 | CH₂–CH–(3-methylphenyl) epoxide | anthraquinone –S–CH₂–CH(OH)–(3-methylphenyl) |
| 16 | CH₂–CH–(4-methylphenyl) epoxide | anthraquinone –S–CH₂–CH(OH)–(4-methylphenyl) |
| 17 | CH₂–CH–(2-chlorophenyl) epoxide | anthraquinone –S–CH₂–CH(OH)–(2-chlorophenyl) |
| 18 | CH₂–CH–(3-chlorophenyl) epoxide | anthraquinone –S–CH₂–CH(OH)–(3-chlorophenyl) |
| 19 | CH₂–CH–(4-chlorophenyl) epoxide | anthraquinone –S–CH₂–CH(OH)–(4-chlorophenyl) |
| 20 | CH₂–CH–COOCH₃ epoxide | anthraquinone –S–CH₂–CH(OH)–COOCH₃ |

Table 2-continued

| I Epoxides | II Anthraquinone dyes |
|---|---|
| 21 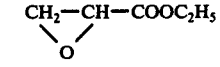 | 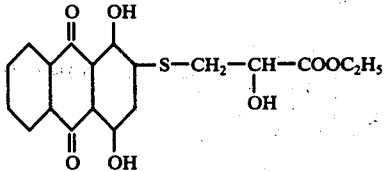 |

EXAMPLE 4

2 parts of the dye obtained in Example 1 are dispersed in 4000 parts of water. To this dispersion are added as swelling agent 12 parts of the sodium salt of o-phenylphenol and 12 parts of diammonium phosphate and 100 g of polyethylene glycol terephthalate yarn are dyed therein for 1½ hours at 95° to 98° C. The dyed fabric is rinsed and given an aftertreatment with aqueous sodium hydroxide solution and a dispersant. A reddish violet dyeing which is fast to washing, light and sublimation is obtained. A reddish violet dyeing which has very good fastness to washing and sublimation is obtained by substituting 100 parts of cellulose triacetate fabric for the 100 parts of polyethylene glycol terephthalate yarn used in this Example and dyeing under the given conditions and finally rinsing the fabric with water.

EXAMPLE 5

In a pressure dyeing machine, 2 parts of the dye obtained in Example 2 are finely suspended in 2000 parts of water which contains 4 parts of oleyl polyglycol ether. The pH of the dyebath is adjusted to 4 to 5 with acetic acid. Then 100 parts of polyethylene glycol terephthalate fabric are put into the dyebath at 50° C. The bath is heated to 140° C in the course of 30 minutes and dyeing is performed for 50 minutes at this temperature. The dyed fabric is subsequently rinsed with water, soaped and dried. A reddish violet dyeing which is fast to washing, perspiration, light and sublimation is obtained under these conditions. The dyes described in the other Examples yield dyeings of equal quality by carrying out this procedure.

EXAMPLE 6

Polyethylene glycol terephthalate fabric is impregnated on a padder at 40° C with a liquor of the following composition:
20 parts of te dye of Example 1 finely dispersed in
7.5 parts of sodium alginate
20 parts of triethanolamine
20 parts of octylphenol polyglycol ether and
900 parts of water.
The fabric, which is squeezed out to a pick-up of app. 100%, is dried at 100° C and subsequently fixed for 30 seconds at a temperature of 210° C. The dyed fabric is rinsed with water, soaped and dried to give under these conditions a reddish violet dyeing which is fast to washing, rubbing, light and sublimation.

The dyes described in the other Examples yield dyeings of equal quality by carrying out this procedure.

We claim:
1. An anthraquinone dyestuff which is sparingly soluble in water of the formula

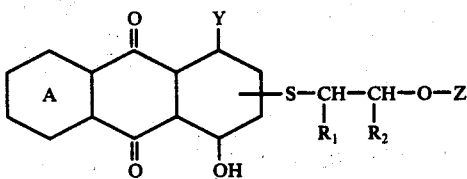

wherein Y is amino, alkylated amino or hydroxyl, the ring A can be substituted by halogen, methyl, ethyl, methoxy, ethoxy, nitro or acylamino, Z is $C_1$-$C_4$-alkylcarbonyl, $C_1$-$C_4$-alkylaminocarbonyl, $C_1$-$C_4$-alkyloxycarbonyl, —CHO or hydrogen, and one of $R_1$ and $R_2$ is hydrogen and the other is $C_1$-$C_8$-alkyl, $C_1$-$C_8$-alkyl substituted by cyclohexyl, cyclopentyl, phenyl, nitrophenyl, $C_1$-$C_2$-alkoxyphenyl, chlorophenyl, $C_1$-$C_2$-alkylphenyl, bromophenyl, fluorophenyl, cyano, chlorine or bromine, cycloalkyl, or aryl or substituted aryl or a carboxy ester group.

2. A dyestuff according to claim 1 of the formula

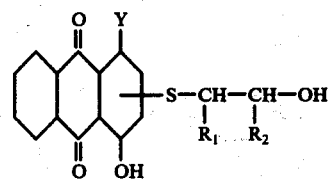

wherein Y, $R_1$ and $R_2$ are as defined in claim 1.

3. A dyestuff according to claim 2 of the formula

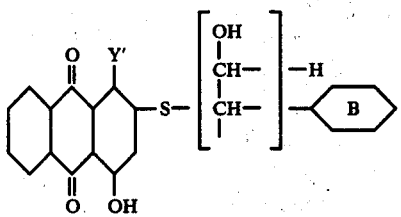

wherein Y' represents OH or $NH_2$ and the ring B can be substituted by non-ionogenic groups.

4. A dyestuff according to claim 1, wherein Y is amino, amino carrying $C_1$-$C_4$-alkyl, or hydroxyl, the ring A can be substituted by $C_1$-$C_2$-alkyl, $C_1$-$C_2$-alkoxy, nitro or $C_1$-$C_4$-alkylcarbonylamino, Z is $C_1$-$C_4$-alkylcarbonyl, $C_1$-$C_4$-alkylaminocarbonyl, $C_1$-$C_4$-alkyloxycarbonyl, —CHO, or hydrogen, and of $R_1$ and $R_2$ one R is hydrogen and the other is $C_1$-$C_8$-alkyl, $C_1$-$C_8$-alkyl substituted by cyclohexyl, cyclopentyl, phenyl, nitrophenyl, $C_1$-$C_2$-alkoxyphenyl, chlorophenyl, $C_1$-$C_2$-alkylphenyl, bromophenyl, fluorophenyl, cyano, chlorine and bromine, and cyclohexyl and cyclopentyl; carbo($C_1$-$C_4$-alkoxy); phenyl, and phenyl substituted by fluorine, bromine, chlorine, nitro, cyano, $C_1$-$C_3$-alkyl, $C_1$-$C_3$-alkoxy, $C_1$-$C_4$-alkoxycarbonyl, $C_1$-$C_4$alkylcarbonyl, $C_1$-$C_4$-alkylcarbonylamino or trifluoromethyl.

5. A dyestuff according to claim 4, wherein Z is hydrogen.

6. A dyestuff according to claim 1 of the formula

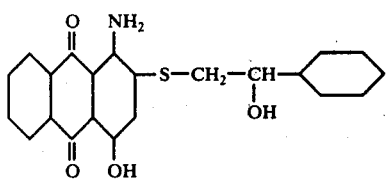

7. A dyestuff according to claim 1 of the formula

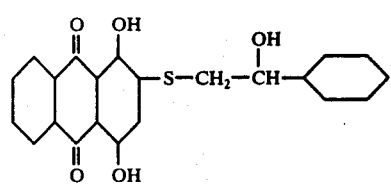

8. A dyestuff of the formula

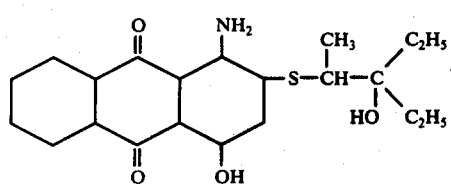

9. A dyestuff of the formula

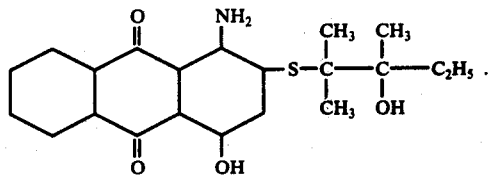

10. A dyestuff of the formula

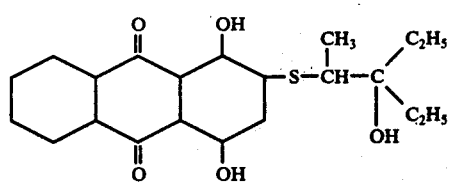

11. A dyestuff of the formula

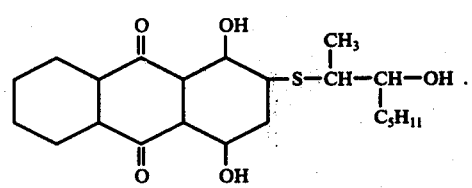

12. A dyestuff of the formula

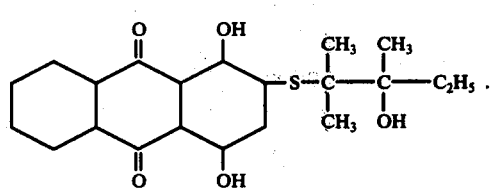

* * * * *